T. T. HARRISON.
Sulky-Plow.

No. 218,734. Patented Aug. 19, 1879.

WITNESSES:
Henry N. Miller
C. Sedgwick

INVENTOR:
T. T. Harrison
BY Munn & Co
ATTORNEYS.

2 Sheets—Sheet 2.
T. T. HARRISON.
Sulky-Plow.
No. 218,734. Patented Aug. 19, 1879.
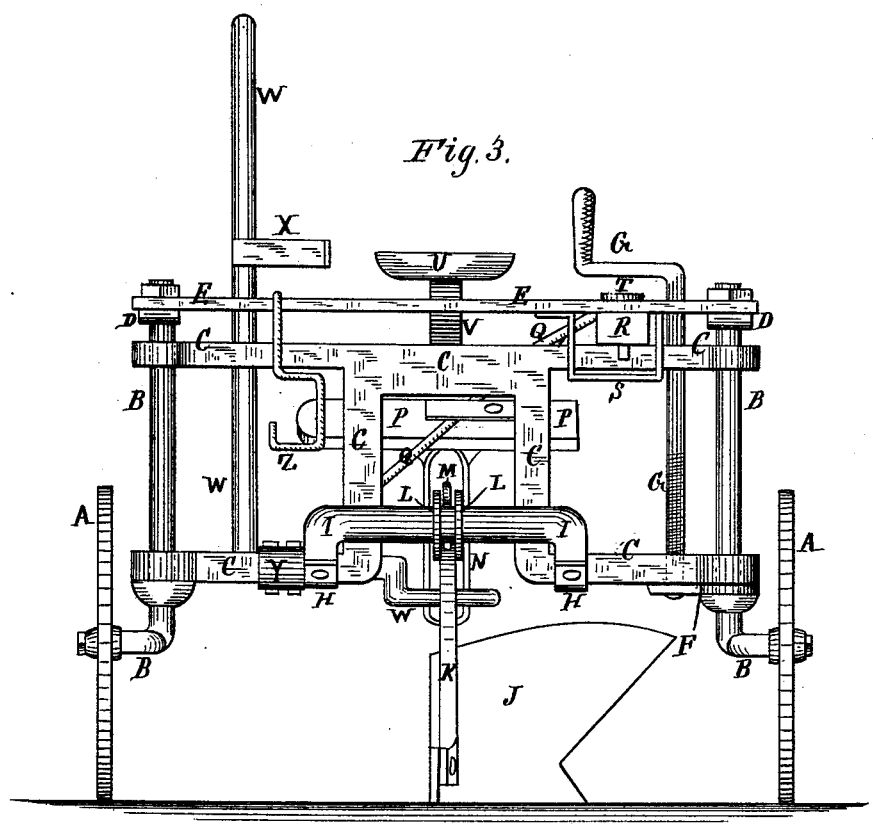
WITNESSES:
Henry N. Miller
C. Sedgwick
INVENTOR:
T. T. Harrison
BY Munn &c
ATTORNEYS.

UNITED STATES PATENT OFFICE.

THOMAS T. HARRISON, OF AUBREY, KANSAS.

IMPROVEMENT IN SULKY-PLOWS.

Specification forming part of Letters Patent No. 218,734, dated August 19, 1879; application filed May 24, 1879.

*To all whom it may concern:*

Be it known that I, THOMAS T. HARRISON, of Aubrey, in the county of Johnson and State of Kansas, have invented a new Improvement in Sulky-Plows, of which the following is a specification.

Figure 1:
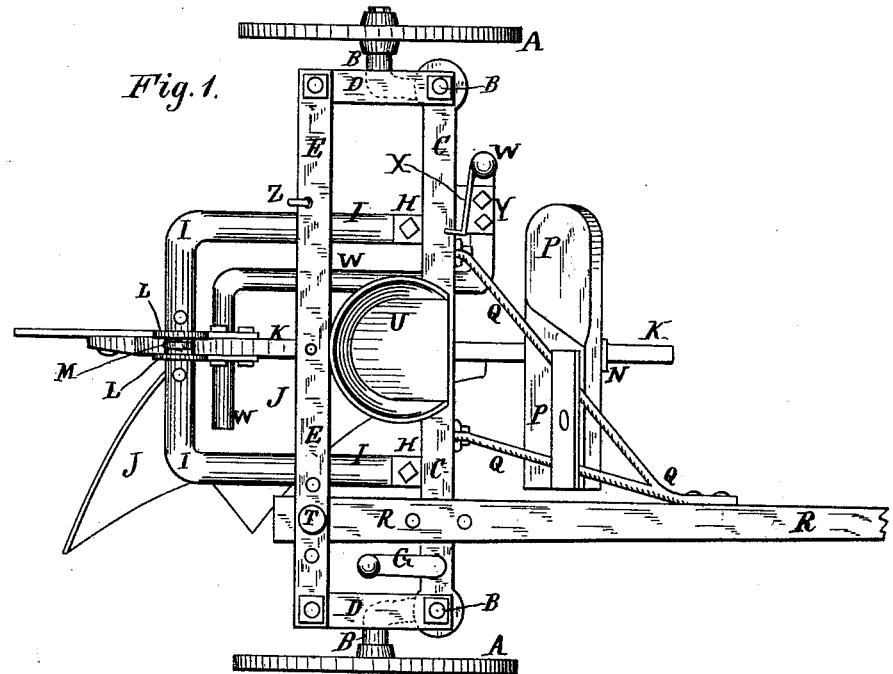
Figure 2:
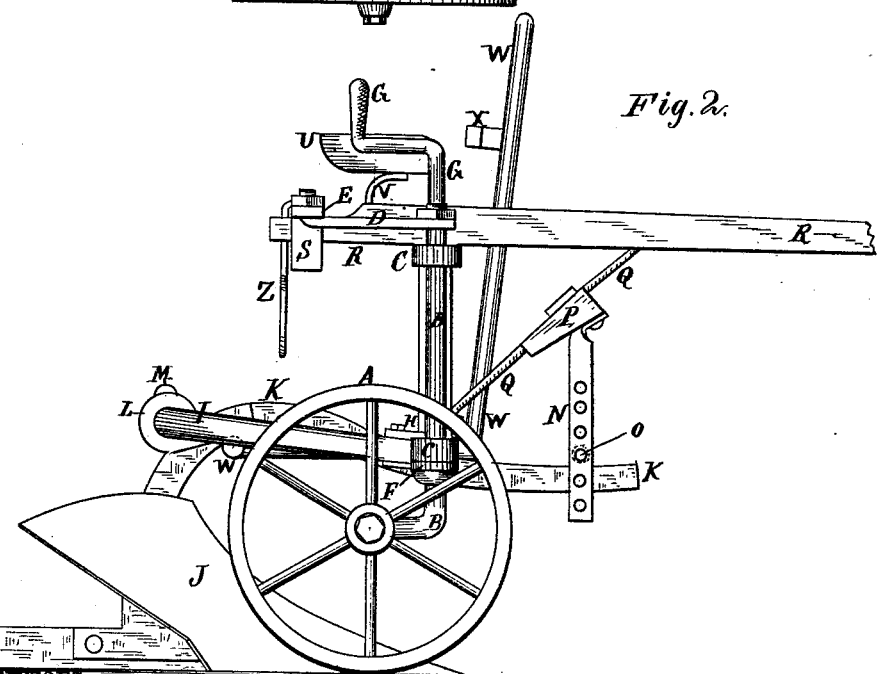

Figure 1, Sheet 1, is a top view of my improved machine. Fig. 2, Sheet 1, is a side view of the same. Fig. 3, Sheet 2, is a rear view of the same.

Similar letters of reference indicate corresponding parts.

The object of this invention is to furnish an improved attachment for breaking and cultivating plows, which shall be simple in construction and convenient in use, so that the plow can be easily and fully controlled.

The invention consists in the sulky formed by the combination of the wheels, the crank-axles, the frame, the short side bars, the cross-bar, and the pivoted tongue with each other, to adapt it to receive a breaking-plow or cultivating-plows.

A are the wheels, which revolve upon the journals of the axles B. The axles B are bent forward and then upward, and pass through holes in the arms of the frame C. The upper part of the axles B are squared to fit into square holes in the forward ends of the short side bars, D, which are secured in place by nuts screwed upon the upper ends of the said axles. To the rear end of the two bars D are bolted the ends of the cross-bar E. The lower arms of the frame C rest upon shoulders formed upon the upright parts of the axles B.

F is a bar placed upon the axle B of the furrow-wheel A, between its shoulder and the lower arm of the frame C, and to the inner end of which is swiveled the end of a screw, G. The screw G passes through a screw-hole in the lower arm of the frame C, through a hole in the upper arm C, and has a crank formed upon or attached to its upper end. By this construction, by turning the crank-screw G, the sulky-frame may be kept level, whether the furrow-wheel be running in a deep or shallow furrow, or upon the same level as the land-side wheel. The inner parts of the lower arms of the frame C are rounded to receive the clasps or straps H, which are passed around them, and the ends of which are bolted to the upper and lower sides of the ends of the crank I.

J is the plow, and K is the plow-beam. To the opposite sides of the rear part of the plow-beam K are bolted the lower ends of two plates, L, the upper parts of which project and have holes formed through them to receive the middle part of the crank I. The middle part of the crank I has a number of holes formed through it to receive the pin M, which is passed through one or the other of the said holes between the plates L to hold the plow against lateral movement. By this construction the plow may be adjusted to cut a wider or a narrower furrow by moving the pin M from one to another of the holes in the crank I. With this construction the bar I, to which the plow is attached, is hinged to the frame C, so that the operation of the plow will not be affected by the movements of the sulky in passing over uneven ground, the plow always running at a uniform depth. The draft is applied to the forward end of the plow-beam K.

The forward part of the plow-beam K passes through the slotted hanger or guide N, which has a number of holes formed through it to receive a pin, O, which should have a small roller placed upon it to prevent friction and wear upon the upper side of the plow-beam. The pin O serves as a fulcrum for the plow-beam to bear against when the plow is being raised from the ground. The slotted bar or hanger N also gives steadiness to the plow when at work. The upper end of the hanger N is attached to the foot-rest P, which is attached to the tongue-braces Q. The lower ends of the braces Q are secured to the lower ends of the upright bars of the frame C, and their upper ends are secured to the tongue R. The tongue R is secured to the top bar of the frame C by a staple, bolt, or clip, and its rear end passes through a keeper, S, attached to the cross-bar E. The keeper S is made longer than the width of the tongue, to give the said tongue the requisite play. The play of the tongue R may be prevented, when desired, by a pin, T, dropped through the bar E and the end of the tongue R. The tongue R is attached to the frame C and the cross-bar E near one end, so that one of the horses may walk in the furrow and the other upon the unplowed land.

U is the driver's seat, which is attached to the upper arm of a spring, V, the lower end of which is attached to the top bar of the frame C.

W is a lever, which is bent three times at right angles, so that its lower arm may cross beneath the rear part of the plow-beam K, while its upper arm passes up at the forward side of the frame C into such a position that its upper end can be conveniently reached and operated by the driver from his seat. To the upper arm of the bent lever W is attached a foot-rest, X, so that the driver can operate the said lever with his foot when desired. The lever W is pivoted to the lower arm of the frame C by a strap or clip, Y. The part of the lower arm of the lever W that passes beneath the plow-beam K should have a roller placed upon it to lessen the friction and wear and make it work easier.

When the machine is to be used as a cultivator, the plow J K, the lever W, and the crank I are detached, and the cultivator-beams are secured to the lower arms of the frame C by the straps or clips H. In this case the tongue R should be secured to the centers of the top bar of the frame C and of the cross-bar E, and the draft should be applied to the tongue R or to the frame C.

When the machine is to be used as a sulky-breaker, the keeper S gives the wheels A play when upon rough ground, and when turning at the corners it takes the strain off the said wheels A, as they will run in the line of draft. The bends in the axles B make the sulky run in the line of draft, and, in connection with the play allowed by the keeper S, cause the sulky to run with the plow exactly. To the cross-bar E are attached one or more hooks, Z, to receive and support the cultivators when turning around and when passing from place to place.

When the machine is to be used as a cultivator, the axles and the wheels B A should be exchanged, which will bring the cranks of the said axles forward, and will take the down-draft off the necks of the horses.

Having thus described my invention, I claim as new and desire to secure by Letters Patent—

The sulky formed by the combination of the wheels A, the swiveled crank-axles B, the frame C, the short side bars, D, the cross-bar E, and the pivoted tongue R with each other, to adapt it to receive a breaking-plow or cultivating-plows, substantially as herein shown and described.

THOMAS TROUSDALE HARRISON.

Witnesses:
C. G. CASE,
E. A. BEST.